US006283747B1

(12) United States Patent
Legiret et al.

(10) Patent No.: US 6,283,747 B1
(45) Date of Patent: Sep. 4, 2001

(54) METHOD FOR HEATING A FURNACE

(75) Inventors: Thierry Legiret, Toussus le Noble; Gérard Le Goueffflec, Magny les Hameaux; Thierry Borissoff, Elancourt, all of (FR); Olivier Charon, Chicago, IL (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/399,158

(22) Filed: Sep. 20, 1999

(30) Foreign Application Priority Data

Sep. 22, 1998 (FR) .................................................. 98 11798

(51) Int. Cl.[7] ........................................................ F27B 9/12
(52) U.S. Cl. .................................. 432/12; 432/18; 431/10
(58) Field of Search ..................... 432/4, 12, 18, 432/19, 20; 431/8, 10, 181, 187

(56) References Cited

U.S. PATENT DOCUMENTS

| 4,547,150 | * | 10/1985 | Vereecke ................................. 432/12 |
| 4,931,013 | | 6/1990 | Brahmbhatt et al. . |
| 5,871,343 | * | 2/1999 | Baukal, Jr. et al. .................... 431/10 |
| 5,904,475 | * | 5/1999 | Ding ........................................ 431/10 |

FOREIGN PATENT DOCUMENTS

| 1 514 842 A | 6/1978 | (GB) . |
| 2 046 415 A | 11/1980 | (GB) . |

OTHER PUBLICATIONS

English abstract of JP 09 303728, Patent Abstracts of Japan, vol. 098, No. 3, Feb. 27, 1998.
English abstract of JP 08 277406, Patent Abstracts of Japan, vol. 097, No. 2, Feb. 28, 1997.
English abstract of JP 04 293740, Patent Abstracts of Japan, vol. 017, No. 108, Mar. 5, 1993.

* cited by examiner

*Primary Examiner*—Gregory Wilson
(74) *Attorney, Agent, or Firm*—Burns, Doane, Swecker & Mathis, L.L.P.

(57) ABSTRACT

The invention relates to a method for heating a furnace comprising at least one burner capable of operating on an oxidant the oxygen content of which can vary; in a first period (P1) the burner is supplied with practically pure oxygen so as to provide a large amount of energy for heating, in a second period (P2) the burner is supplied with an oxidant, the oxygen content of which can vary between about 100% and 21%, in a third period (P3), the burner is supplied with an oxidant, the oxygen content of which is minimal, and which corresponds to a pilot period which requires only a small amount of heating energy. This method makes it possible to optimize the use of the furnace according to the desired thermal performance and oxidant operating costs.

20 Claims, 2 Drawing Sheets

METHOD FOR HEATING A FURNACE

This application claims priority under 35 U.S.C. §§119 and/or 365 to 98 11798 filed in France on Sep. 22, 1998; the entire content of which is hereby incorporated by reference.

BACKGROUND OF THE INVENTION

1. Field of the Invention

The invention relates to a method for heating a furnace comprising at least one burner capable of operating on an oxidant the oxygen content of which can vary. Such burners, described, for example, in documents EP-192,682 and EP-432,153, are designed for various situations.

2. Description of Related Art

Most industrial furnaces, such as (s)melting furnaces or annealing furnaces, are equipped with burners which operate on air as the oxidant.

In each application of these burners, a specific oxidant, for example consisting of oxygen-enriched air, is chosen, the oxygen content of the oxidant being kept constant during operation.

Document GB-A-1,514,842 describes a method in which oxygen is periodically added to the oxidizing air to smelt successive charges of scrap in a furnace; after this the oxygen supply is interrupted and the charge is refined using only air as the oxidant. This therefore is a conventional burner "doped" with oxygen in the flame, this document not envisaging the use of pure oxygen.

Document U.S. Pat. No. 4,931,013 teaches the use of a burner which is "doped" with a pure oxygen lance, the injection of which pure oxygen into the combustion air enriches its oxygen content to as much as 35%. Thus, in a first phase, hydrocarbons are completely burnt by virtue of this oxygen "doping", then the injection of pure oxygen is interrupted and the process continues using only oxygen-enriched air.

Patent abstracts of Japan Vol. 098 No 003 of 27.02.1998 (JP-09-30728) relates to a cremation method in which, in a first phase, a conventional burner is used; in a second phase, in order to be able to cremate items which are difficult to burn, use is also made of a lance which injects a mixture of air and oxygen onto these items on the outside of the burner.

In all these known methods, the air supply is never interrupted, and the oxygen content of the oxidant never exceeds 35%.

Now, depending on the furnaces and particular envisaged applications thereof, and on considerations relating to the thermal performance and running cost, it may prove advantageous to be able to alter the oxygen content in a range which is far wider than 21 to 35%. An oxygen content of 21% is that of air, an inexpensive oxidant but one whose thermal performance is modest. Conversely, an oxidant consisting of almost pure oxygen is very powerful, but expensive. Now, the known burners of the state of the art do not allow such relative optimization of performance with respect to economic cost.

The invention therefore sets out to propose an optimized and economic heating method for all applications of the burners in question.

SUMMARY OF THE INVENTION

To this end, the subject of the invention is a method for heating a furnace comprising at least one burner capable of operating on an oxidant the oxygen content of which can vary, characterized in that:

a) in a first period (P1) the burner is supplied with practically pure oxygen so as to provide a large amount of energy for heating, b) in a second period (P2) the burner is supplied with an oxidant, the oxygen content of which can vary between about 100% and 21% according to considerations relating to the desired heat performance and cost of operation of this oxidant, c) in a third period (P3), the burner is supplied with an oxidant, the oxygen content of which is minimal, and which corresponds to a pilot period which requires only a small amount of heating energy.

According to other features of the invention:

during the second period, pure oxygen and air are injected separately into the burner, during the third period it is predominantly air which is injected into the burner, the said first period which requires a great deal of heating energy, corresponds to intense heating including the case of a (s)melting period, for a furnace which is charged in batches, the said first period, corresponds to the raising of the temperature of the product. For a continuous furnace, this first period, corresponds to a high rate of production, that is to say to a high demand for heat.

the flow rates of fuel and air are set to a level such that the heating power of the said at least one burner is more or less 50 to 60% of the nominal power of the burner during the first period.

BRIEF DESCRIPTION OF FIGURES OF THE DRAWINGS

Other particular features and advantages of the invention will become apparent from the description which follows, given by way of example without implying any limitation, with reference to the appended drawings, in which.

DETAILED DESCRIPTION OF THE PREFERRED EMBODIMENTS

Figure 1:
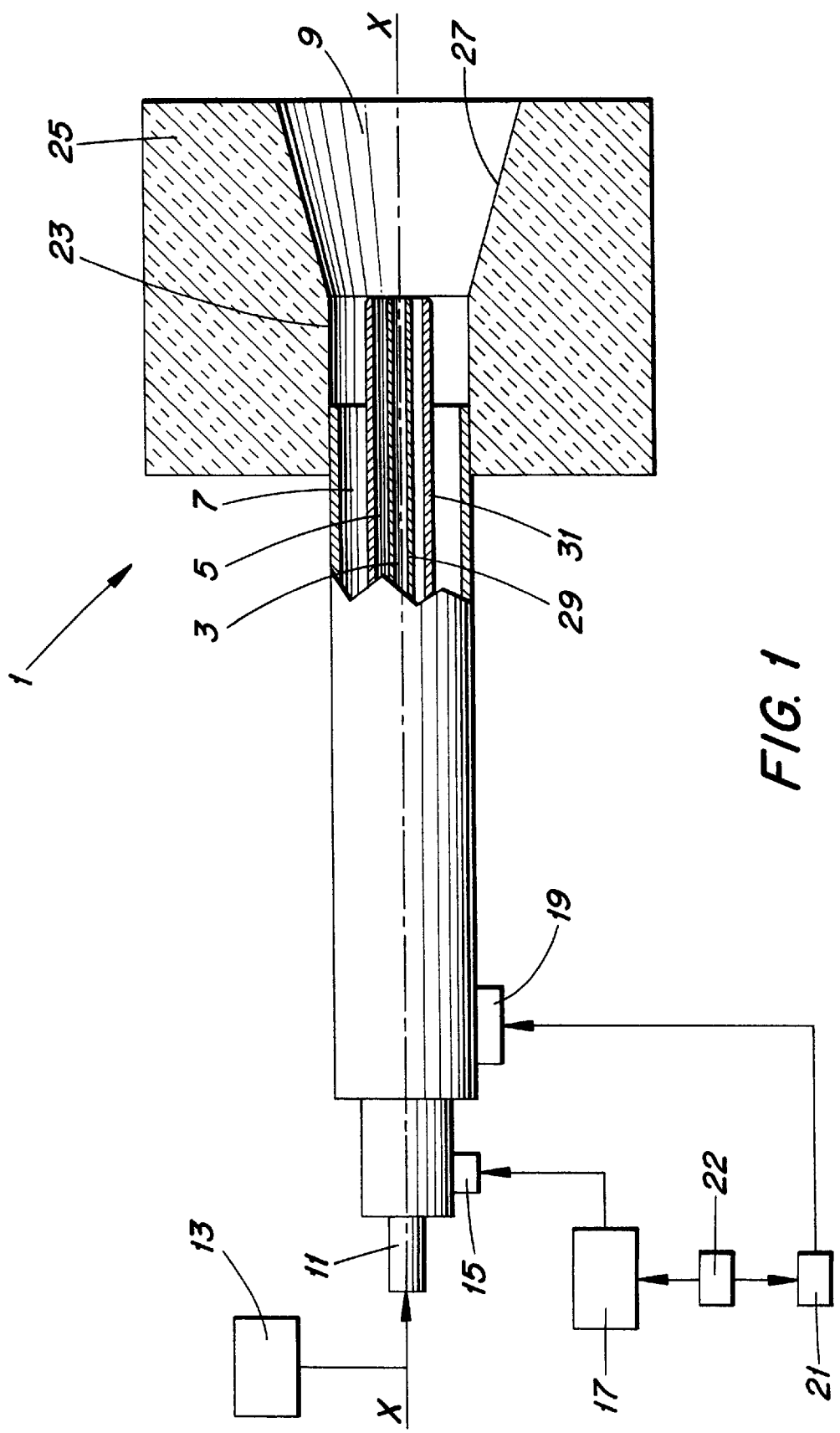
FIG. 1 shows a sectioned view of a burner operating on different oxidants, the oxygen content of which is between about 21 mol % and practically 100 mol %.

FIG. 1 depicts a burner 1 operating on different oxidants, the oxygen content is which is between about 21 mol % and practically 100 mol % and which is intended to be installed in a furnace, particularly a glass furnace, a rotary iron-smelting furnace or an annealing furnace.

This burner 1 comprises three ducts 3, 5 and 7 for conveying gas into an opening 9 which opens into a combustion region of a furnace, not depicted. These three ducts 3, 5 and 7 are arranged concentrically about an axis X-X of the burner 1.

The duct 3 is connected by its gas-inlet end 11 to a member 13 for regulating the flow rate of a fuel, such as natural gas for example.

The intermediate annular duct 5 has an inlet end 15 connected to a member 17 for regulating the flow rate of practically pure oxygen, that is to say of an oxidant whose oxygen content is in excess of about 90 mol %.

The peripheral annular duct 7 has an air inlet 19. This duct 7 is supplied by a member 21 for regulating the air flow rate.

Furthermore, the regulating members 17 and 21 are connected to a control unit 22 which makes it possible to alternate between operation using air as the oxidant and operation using practically pure oxygen as the oxidant.

Furthermore, the front end of the burner 1 is introduced into a cylindrical passage 23 in a block 25 of refractory material. The passage 23 of the block 25 opens into a flared passage constituting the opening 9, which opens towards the combustion region.

The outlet ends of the burner are formed, on the one hand, by the passage 23 made in the block 25 and, on the other hand, by two tubes, a central tube 29 and an intermediate tube 31, made, for example, of refractory steel so that they can withstand the heat developed by the combustion process.

Figure 2:
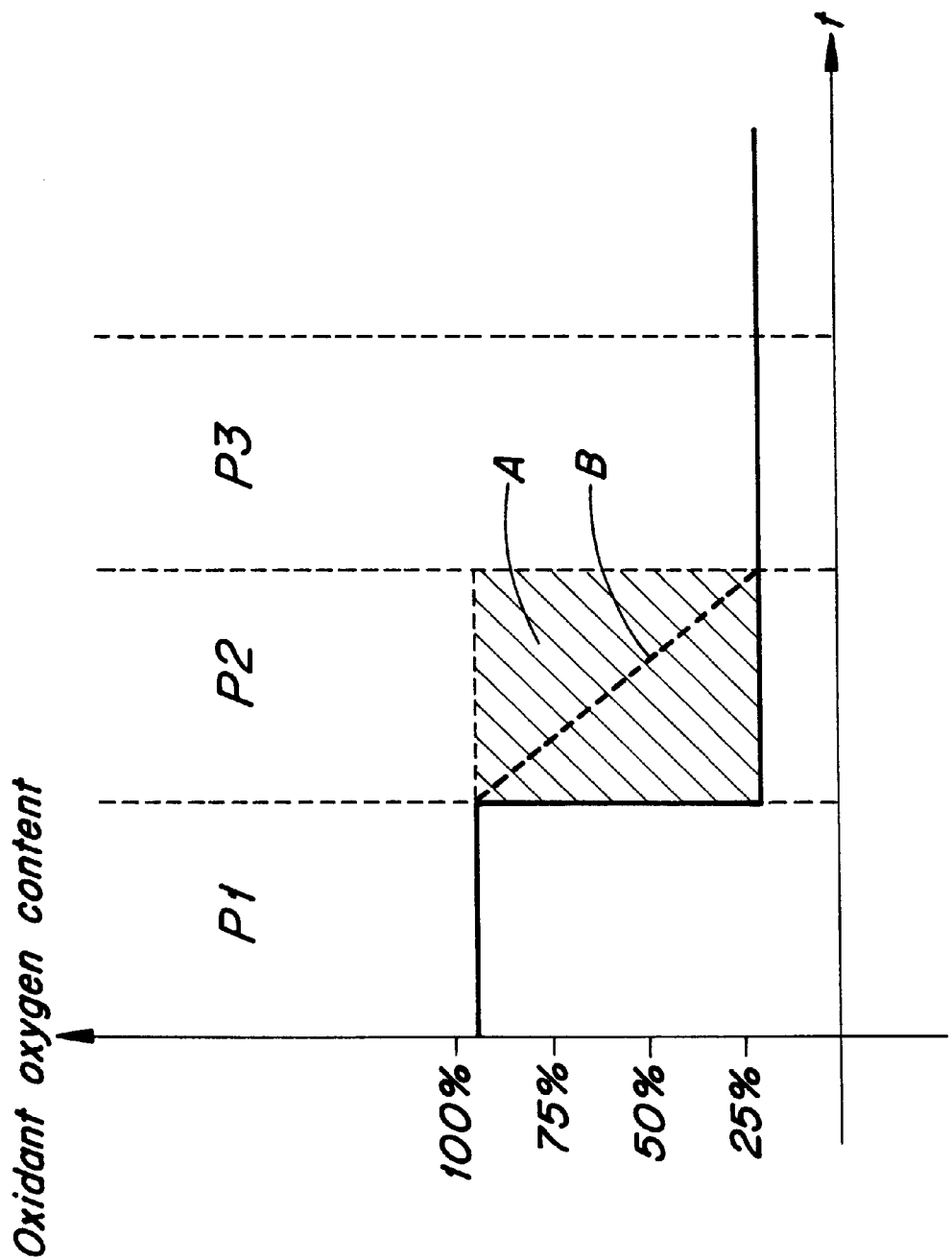
FIG. 2 shows a graph illustrating a control cycle for heating a (s)melting furnace using the method of the invention.

The method of the invention will be described in detail hereinafter with reference to FIG. 2, which depicts a graph illustrating a cycle for controlling a smelting furnace equipped with one or more burners like the one described hereinabove.

This graph shows time t along the abscissae and shows the oxygen content of the oxidant, in moles, along the ordinates.

Furthermore, also depicted are three periods P1, P2 and P3 which correspond, respectively to various stages in the operation of the furnace.

The period P1 corresponds to a (s)melting step, requiring a great deal of heat energy. During this period, the burner is supplied with practically pure oxygen as its oxidant, possibly with the addition of a small amount of air.

During the second period P2, the burner is supplied with an oxidant, the oxygen content of which varies between about 100% and 21%, in region A, for example following the straight line B which is given by way of non-limiting example. This is because this variation can be optimized continuously, according to the applications, as a function of consideration of thermal performance and cost of use of the oxidant, so as to refine the charge in the furnace. Thus, during the second period P2, the burner is supplied with a mixture of air and pure oxygen, the content of which is continuously adjusted.

During the third period P3, the oxygen content is minimal, the burner being supplied predominantly with air the oxygen content of which is 21%. This third period P3 corresponds, for example, to a pilot period of the furnace (night, weekend), during which its production is halted but the furnace has to be kept at the appropriate temperature.

Thus, oxygen, which is more expensive than air as an oxidant, is used only at useful moments, that is to say when the power to be supplied to the furnace has to be high, this making it possible to optimize its operation.

During the pilot period P3, the flow rates of fuel and of air can be set to a level such that the heating power of the burner 1 is, for example, at most 50 to 60% of the nominal power of the burner.

It will therefore be understood that this method makes it possible very advantageously to optimize the use of oxygen in the operation of a furnace, by allowing its content in the oxidant to be varied in a continuous range from 21% to 100%, depending on the desired cost and performance.

This method is applicable not only to glass melting furnaces, but also to rotary iron smelting furnaces, annealing furnaces or the like.

For a furnace which is continuously charged, the region requiring a great deal of heat energy corresponds to the region in which the temperature of the product is raised. Such furnaces are, for example, annealing furnaces, forging reheat furnaces or alternatively glass melting furnaces.

What is claimed is:

1. A method for heating a furnace, the furnace comprising at least one burner capable of operating on an oxidant the oxygen content of which can vary, the method comprising the steps of:

supplying the burner during a first period (P1) with oxidant consisting essentially of pure oxygen so as to provide a large amount of energy for heating;

supplying the burner during a second period (P2) with an oxidant, the oxygen content of which oxidant being between about 100% and about 21% based on the desired heat performance and cost of operation of this oxidant;

supplying the burner during a third period (P3) with an oxidant, the oxygen content of which oxidant is minimal, the third period including a pilot period which requires only a small amount of heating energy.

2. A method according to claim 1, wherein the step of supplying oxidant during the second period comprises separately injecting pure oxygen and air into the burner.

3. A method according to claim 2, wherein the step of supplying oxidant during the third period comprises injecting predominantly air into the burner.

4. A method according to claim 3, wherein the furnace is a melting furnace, wherein the step of supplying oxidant during the first period (P1) comprises supplying pure oxygen during a melting period.

5. A method according to claim 3, wherein the furnace is a furnace which is charged in batches, wherein the step of supplying oxidant during the first period (P1) comprises supplying pure oxygen during a period of raising the temperature of the product.

6. A method according to claim 3, wherein the furnace is a continuous furnace, wherein the step of supplying oxidant during the first period (P1) comprises supplying pure oxygen during a period of high rate of production.

7. A method according to claim 3, wherein the step of supplying oxidant during the second period (P2) comprises supplying fuel and air at flow rates of the fuel and air such that the heating power of the burner is between about 50% and about 60% of the nominal power of the burner.

8. A method according to claim 2, wherein the furnace is a melting furnace, wherein the step of supplying oxidant during the first period (P1) comprises supplying pure oxygen during a melting period.

9. A method according to claim 2, wherein the furnace is a furnace which is charged in batches, wherein the step of supplying oxidant during the first period (P1) comprises supplying pure oxygen during a period of raising the temperature of the product.

10. A method according to claim 2, wherein the furnace is a continuous furnace, wherein the step of supplying oxidant during the first period (P1) comprises supplying pure oxygen during a period of high rate of production.

11. A method according to claim 2, wherein the step of supplying oxidant during the second period (P2) comprises supplying fuel and air at flow rates of the fuel and air such that the heating power of the burner is between about 50% and about 60% of the nominal power of the burner.

12. A method according to claim 1, wherein the furnace is a melting furnace, wherein the step of supplying oxidant during the first period (P1) comprises supplying pure oxygen during a melting period.

13. A method according to claim 12, wherein the furnace is a furnace which is charged in batches, wherein the step of supplying oxidant during the first period (P1) comprises supplying pure oxygen during a period of raising the temperature of the product.

14. A method according to claim 12, wherein the step of supplying oxidant during the second period (P2) comprises supplying fuel and air at flow rates of the fuel and air such that the heating power of the burner is between about 50% and about 60% of the nominal power of the burner.

15. A method according to claim 1, wherein the furnace is a furnace which is charged in batches, wherein the step of supplying oxidant during the first period (P1) comprises supplying pure oxygen during a period of raising the temperature of the product.

16. A method according to claim 15, wherein the step of supplying oxidant during the second period (P2) comprises supplying fuel and air at flow rates of the fuel and air such that the heating power of the burner is between about 50% and about 60% of the nominal power of the burner.

17. A method according to claim 1, wherein the furnace is a continuous furnace, wherein the step of supplying oxidant during the first period (P1) comprises supplying pure oxygen during a period of high rate of production.

18. A method according to claim 17, wherein the step of supplying oxidant during the second period (P2) comprises supplying fuel and air at flow rates of the fuel and air such that the heating power of the burner is between about 50% and about 60% of the nominal power of the burner.

19. A method according to claim 1, wherein the step of supplying oxidant during for the second period (P2) comprises supplying fuel and air at flow rates of the fuel and air such that the heating power of the burner is between about 50% and about 60% of the nominal power of the burner.

20. A method according to claim 1, wherein the step of supplying oxidant during the third period (P3) comprises supplying oxidant with an oxygen content lower than the oxygen content of the oxidant supplied during the step of supplying oxidant during the second period (P2).

* * * * *